United States Patent [19]

Thoor

[11] Patent Number: 4,635,669

[45] Date of Patent: Jan. 13, 1987

[54] TEMPERATURE RESPONSIVE FLUID CONTROL VALVE

[75] Inventor: Henry-Albert Thoor, Villeneuve-sur-Yonne, France

[73] Assignee: FMC Corporation, Chicago, Ill.

[21] Appl. No.: 586,616

[22] Filed: Mar. 6, 1984

[30] Foreign Application Priority Data

Mar. 8, 1983 [FR] France ............................. 83 03754

[51] Int. Cl.[4] .......................................... F16K 17/38
[52] U.S. Cl. ..................................... 137/79; 137/72; 137/492
[58] Field of Search ................................. 137/72, 79

[56] References Cited

U.S. PATENT DOCUMENTS

| 166,452 | 8/1875 | Brown | 137/72 X |
|---|---|---|---|
| 395,856 | 1/1889 | Stuckert | 137/72 X |
| 456,451 | 7/1891 | Turner | 137/72 X |
| 522,656 | 7/1894 | Cuwnnock | 137/72 X |
| 712,693 | 11/1902 | Linn | 137/72 X |
| 929,973 | 8/1909 | McNutt | 137/72 X |
| 1,183,815 | 5/1916 | Hasty | 137/72 |
| 1,891,183 | 12/1932 | Rowley | 137/72 X |
| 3,455,316 | 7/1969 | Rogers | 137/79 X |
| 3,650,328 | 3/1972 | Fujiki | 137/72 X |
| 3,800,878 | 4/1974 | Poitras | 137/72 X |
| 4,355,657 | 10/1982 | Reip | 137/102 X |

FOREIGN PATENT DOCUMENTS

| 475770 | 8/1951 | Canada | 137/72 |
|---|---|---|---|
| 2029050 | 3/1980 | United Kingdom | 137/72 |
| 2094441 | 9/1982 | United Kingdom | 137/79 |

*Primary Examiner*—Harold W. Weakley
*Attorney, Agent, or Firm*—W. William Ritt, Jr.; Richard B. Megley

[57] ABSTRACT

A fluid control valve for protecting a cryogenic fluid circuit comprising a spring biased plug-type control element that is held closed by a spacer meltalile in the presence of fire.

3 Claims, 5 Drawing Figures

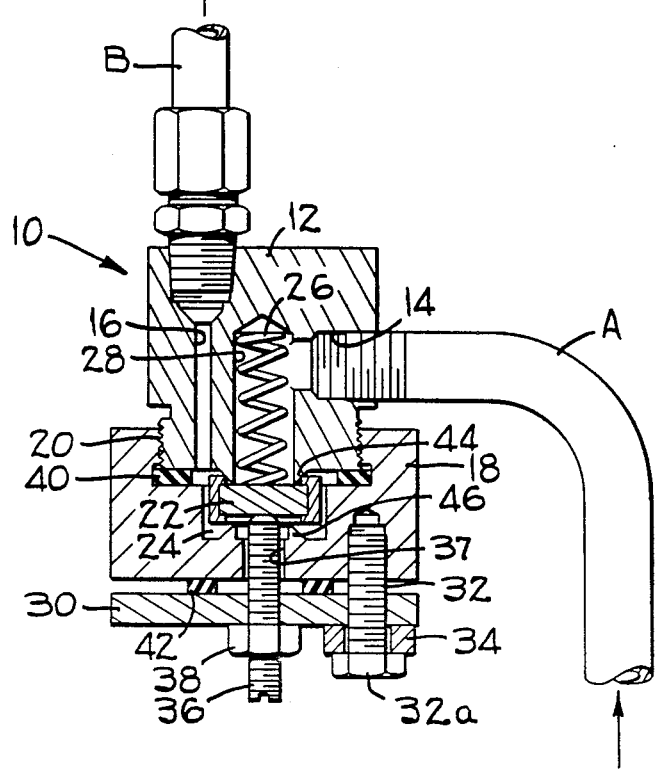
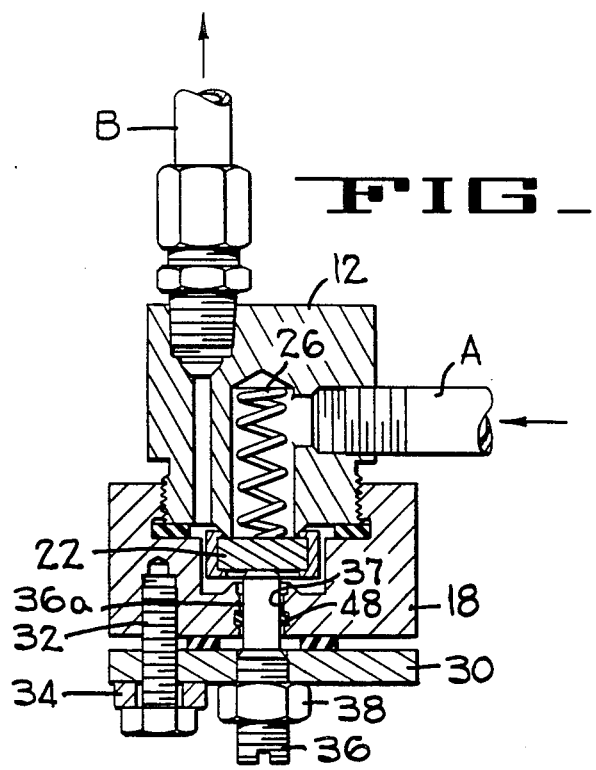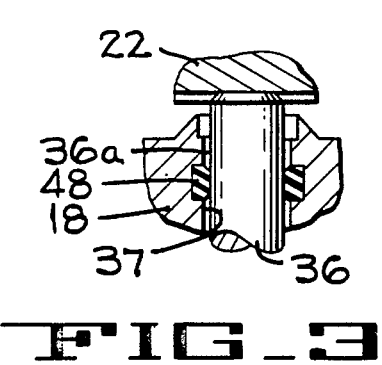

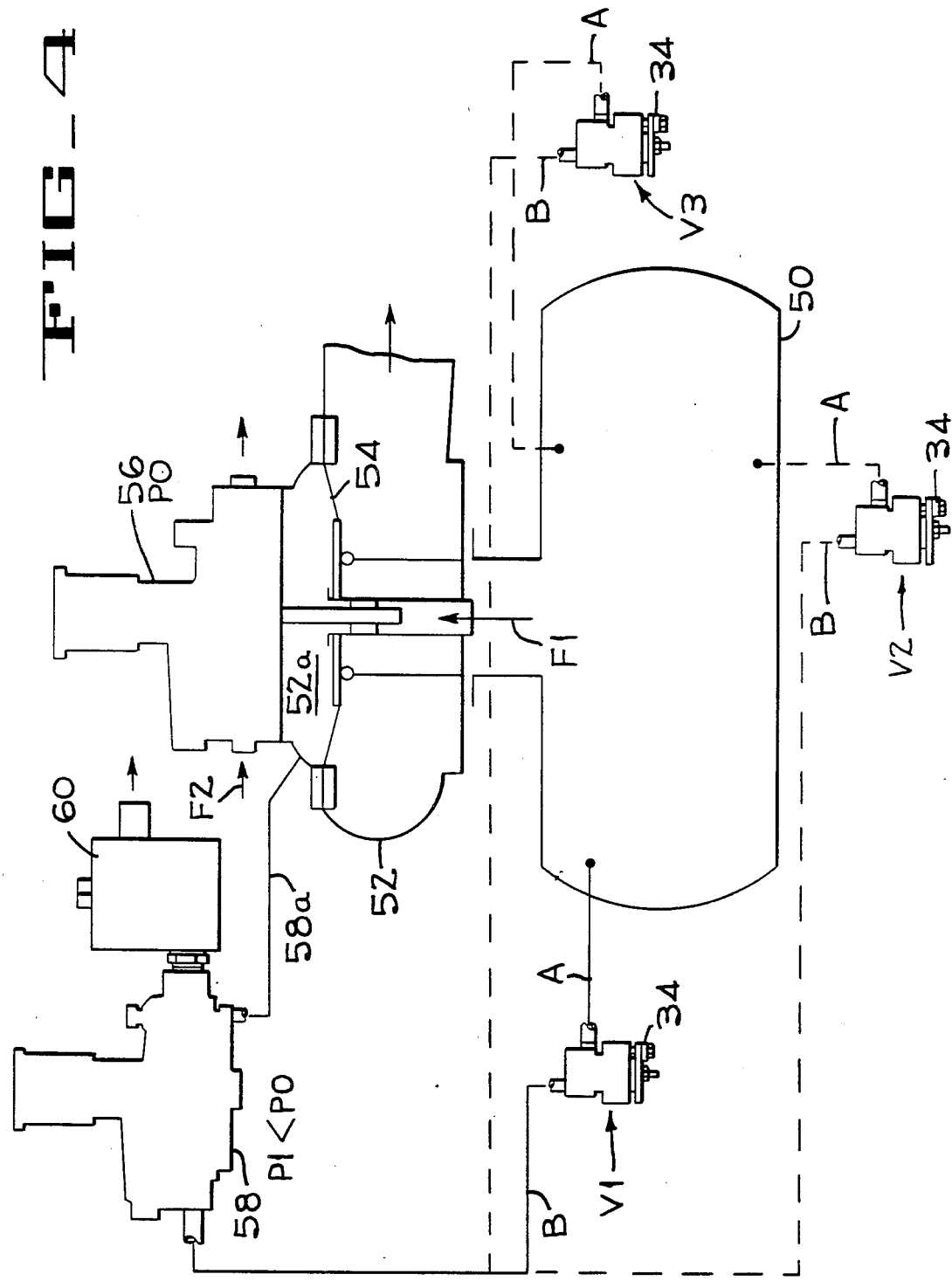

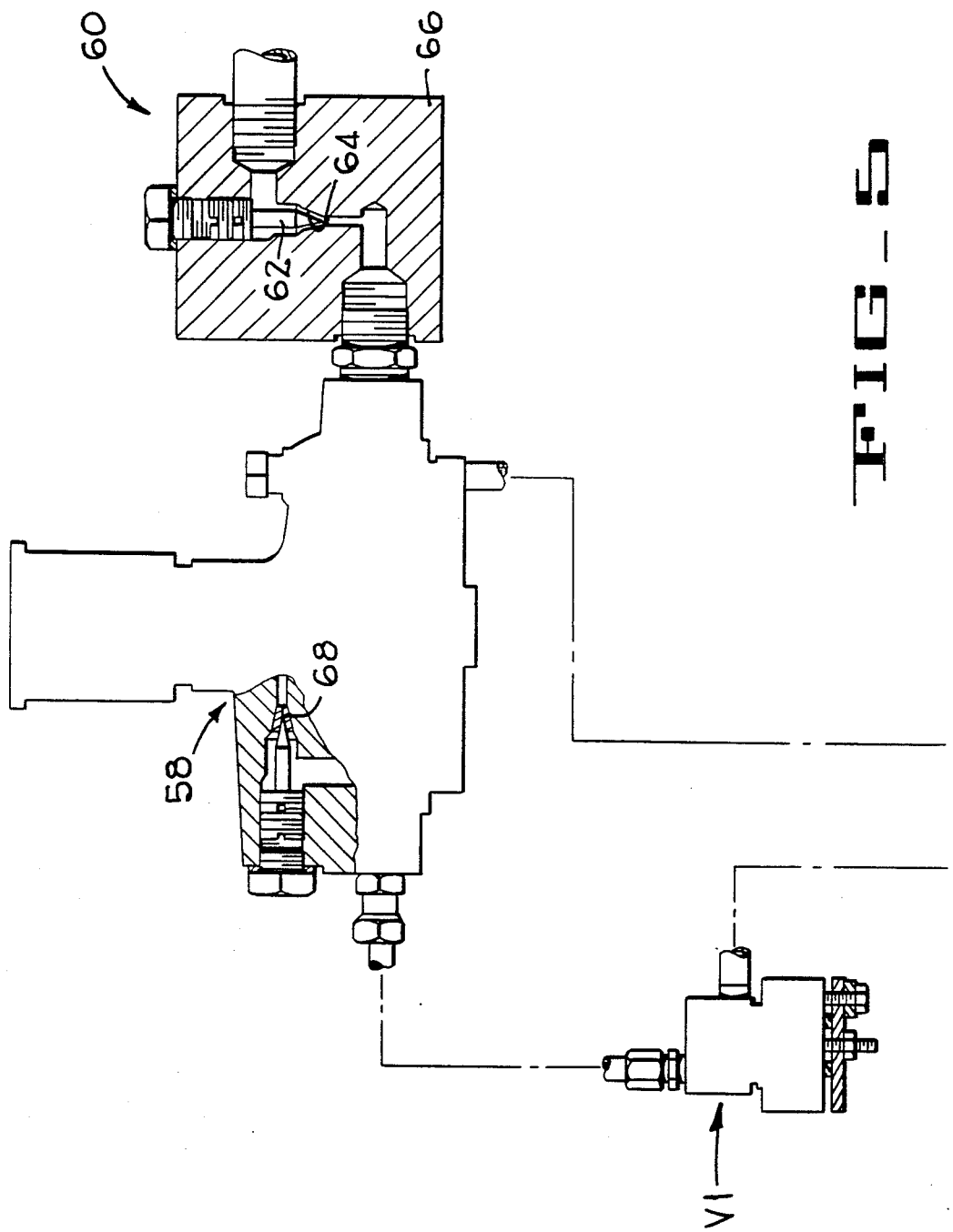
FIG_5

TEMPERATURE RESPONSIVE FLUID CONTROL VALVE

BACKGROUND OF THE INVENTION

This invention relates to fluid control valves, and more particularly to such valves that automatically open in response to elevated temperatures.

SUMMARY OF THE INVENTION

The present invention comprises a fluid control valve especially, but not exclusively, useful for protecting cryogenic fluid circuit installations from dangerous temperature increases, the valve comprising a plug-type flow control element that is spring-biased towards its open position yet is held in its closed position during normal operating temperatures by a temperature responsive retention system. The retention system comprises a support plate movably secured to the exterior of the valve's seat body by a plurality of cap screws or the like, a screw-like compression element adjustably threaded through the plate and extending freely through a wall of the valve's seat body into engagement with the flow control element, and a plurality of annular washer-like spacers of fusible material, such as a metal alloy, between the plate and the heads of the cap screws. When the spacers melt, thereby freeing the plate to move toward the cap screw heads, the flow control element moves in response to its bias spring from its closed position to its open position, whereby fluid can then flow through the valve.

The valve is designed so as to be connectible between two pipes or conduits so that when the valve opens communication between the pipes is established. The interior of the valve is sealed from the outer atmosphere at all times, regardless of the position of the flow control element or of the temperature to which the valve is subjected, so that there is never any loss of pressure to the outside.

The choice of a specific metal alloy or other fusible material employed for the spacers depends on the temperature at which the valve is desired to open, and such material may be modified to provide different melting points and thus permit different utilizations (for example, successive openings of a plurality of valves as the temperature increases).

BRIEF DESCRIPTION OF THE DRAWINGS

FIG. 1 is a vertical central section through a valve embodying the features of the present invention, showing the flow control element in its closed position and the valve interconnecting two pipes.

FIG. 2 is a view like FIG. 1, showing an alternate form of the valve.

FIG. 3 is an enlarged fragmentary view of the flow control element, compression element, valve body and compression element seal of the valve of FIG. 2.

FIG. 4 is a schematic illustration of a fluid circuit installation including three valves according to the present invention.

FIG. 5 is an enlarged fragmentary view of a portion of the schematic of FIG. 4.

DESCRIPTION OF THE PREFERRED EMBODIMENT

In reference first to FIG. 1, a valve 10 in accordance with the present invention broadly comprises an inlet-outlet body 12 with inlet and outlet ports 14, 16 respectively, a seat body 18 threaded at 20 to the body 12, a plug-type flow control element 22 within a chamber 24 between the body 12 and the body 18, a helical or coil spring 26 in a chamber 28 in the body 12 that biases the flow control element 22 towards its open position (not shown), and a temperature responsive flow control element retention system comprising a support plate 30 movably secured to the exterior of the seat body 18 by a plurality (preferably three or more) of circumferentially spaced cap screws 32 (only one shown), a plurality of annular washer-like spacers 34 (only one shown) between the heads 32a of the cap screws and the support plate 30, a screw-like compression element 36 threaded through the support plate 30 and freely extending through a bore 37 in the seat body 18 into the chamber 24 and into engagement with the flow control element 22, and a lock nut 38 for securing the compression element 36 in proper position. Between the body 12 and the body 18 is an annular fluid gasket or seal 40, and another annular gasket or seal 42 functions as a fluid barrier between the body 18 and the support plate 30 when the spacers 34 are intact as shown.

At the opening of the chamber 28 into the chamber 24 is an annular lip 44 against which the flow control element 22 rests when in its illustrated "closed" position, and the compression element 36 functions to establish and maintain fluid-tight contact between the element 22 and the lip 44, thereby preventing flow of fluid through the valve between an inlet pipe A and an outlet pipe B. A similar annular lip 46 at the opening of the bore 37 into the chamber 24 provides a stop against which the flow control element 22 rests in its "open" position (not shown), and in that position the spring 26 presses against the element 22 with sufficient force to assure fluid-tight contact between that element and the lip 46.

The valve 10 preferably is disposed vertically as illustrated, with the support plate 30 below the seat body 18, whereby gravity assists the spring 26 in urging the flow control element 22 toward the lip 46.

Since the valve 10 is intended to remain in its illustrated closed condition, thereby preventing flow from the pipe A to the pipe B, until the ambient temperature rises to a dangerous level, the choice of the composition of the fusible spacers 34 depends upon what that temperature level is for the particular installation and upon the melting point of the composition. Accordingly, the valve 10 can be tailored to suit a wide variety of uses by merely selecting the appropriate fusible composition for the spacers 34.

As should be apparent from the foregoing, so long as the fusible spacers 34 are intact the compression element 36 exerts a force upon the flow control element 22 greater than that of the spring 26, thereby holding the element 22 against the annular lip 44, i.e. in the element's "closed" position. When the spacers 34 melt in response to sufficient temperature elevation their holding function with respect to the support plate 30 is destroyed, and the spring 26 urges the flow control element 22 into its "open" position (not shown) against the annular lip 46. During this movement the compression element 36 and the support plate 30 are forced to move in the same direction until the plate comes to rest against the cap screw heads 32a.

In the alternate embodiment of the valve 10 shown in FIG. 2, an annular seal 48 is positioned in an annular groove 50 in the bore 37 to establish a fluid barrier between the bore and a smooth cylindrical surface 36a on the adjacent portion of the compression element 36.

FIG. 4 illustrates an example of a safety circuit installation using one or more valves V1, V2, V3, each being of the type described above and shown in FIGS. 1–3, that open the circuit automatically and controllably by melting of their spacers in accordance with the present invention. In this example the valves V1, V2, V3 provide protection to a container 50 provided with a diaphragm valve 52, the valve 52 having a diaphragm 54 and a main pilot 56 that operates in response to an internal pressure force in the direction of the arrow F1. An external pressure force, represented by the arrow F2, also may be provided if desired. The pilot 56 is set to a pressure P0.

Communicating with the upper chamber 52a of the valve 52 is the outlet 58a of a safety pilot valve 58. As seen in FIG. 4, the outlet pipe B of the valve V1 is connected to the inlet of the pilot valve 58. This permits the valve 52 to vent for a setting P1 lower than P0, as when the temperature increases abnormally. A major portion of the container 50 therefore can be evacuated through the diaphragm valve 52 since that valve 52 opens before an elevated temperature has had enough time to render the installation dangerous.

As shown in FIG. 4, the inlets A of the valves V1, V2, and V3 can be connected to the container 52, in which case the setting P1 must be lower than the pressure in the container 52. It is also possible to supply the inlets A from a subsidiary air or nitrogen network if the network has an available pressure higher than P1, either constant so that the container 52 is completely evacuated or becoming less than P1 when the protection system has opened, the valve 52 thereafter closing and the pressure in the container 52 stabilizing at P1 as in the case when the supply to the inlets A is provided from the container.

The valves V1, V2 and V3 can be connected in parallel as shown in FIG. 4, thereby to protect several zones surrounding the container 52. In such an installation, the sensing of a dangerously elevated temperature in any one of the zones causes the related valve V1, V2 or V3 to open. The valves V1, V2 and V3 also can be connected in series (not shown) if desired in which case as the temperature increases the valves open sequentially until the safety pilot valve 58 is actuated.

If desired, a vent setting means 60 may be provided at the outlet of the safety valve 58 to facilitate adjustment of the main vent of the diaphragm valve 52. Such a setting means can comprise a needle valve as shown in FIG. 5, having a needle 62 axially adjustable with respect to a seat 64 in a valve body 66. Also, depending upon the type of safety valve 58, a closure plug 68 (FIG. 5) can be provided at a point in the fluid circuit of the valve 58 to prevent the supply fluid from flowing under the pilot diaphragm.

Although the best mode contemplated for carrying out the present invention has been herein shown and described, it will be apparent that modification and variation may be made without departing from what is regarded to be the subject matter of the invention.

What is claimed is:

1. A temperature responsive fluid control valve for opening a pressure relief line in a fluid circuit installation when subjected to dangerous temperature increases, said valve comprising:
    (a) an inlet-outlet body having an inlet port, an outlet port, and a chamber for a flow control element biasing means, said chamber having an inlet in communication with said inlet port and an outlet with a first annular lip-type seat for a flow control element;
    (b) a seat body releasably secured to the inlet-outlet body and having a flow control element chamber in communication with the biasing means chamber and the outlet port, said seat body also having a bore extending from its exterior to the flow control element chamber;
    (c) a second annular lip-type seat in the flow control element chamber, said second lip-type seat surrounding the bore and spaced from and opposed to the first lip-type seat;
    (d) a plug-type flow control element supported within the flow control element chamber for movement between its closed position against the first annular lip-type seat and its open position against the second annular lip-type seat;
    (e) spring means in the biasing means chamber biasing the flow control element towards the second annular lip-type seat; and
    (f) a temperature responsive retention system for releasably holding the flow control element in its closed position against the first annular lip-type seat until the ambient temperature rises to a dangerous level, said system comprising:
        (1) a support plate for the flow control element,
        (2) a plurality of threaded fastening means extending freely through the support plate into threaded engagement with the seat body to movably secure the support plate thereto;
        (3) a washer-like fusible spacer surrounding each fastening means and cooperating therewith to prevent movement of the support plate away from the seat body so long as the ambient temperature is below a predetermined level, and
        (4) a screw-like compression element threaded through the support plate and extending freely through the bore in the seat body into the flow control element chamber for holding the flow control element on the first lip-type seat in opposition to the biasing means,
    whereby fusion of the fusible spacers facilitates movement of the support plate away from the seat body and the flow control element off of the first lip-type seat towards the second lip-type seat, thereby establishing flow communication between the inlet and outlet ports to permit fluid to flow through the valve.

2. A temperature responsive fluid control valve according to claim 1 including an annular seal positioned in an annular groove in the seat body bore for providing a fluid barrier between said bore and the compression element.

3. A temperature responsive fluid control valve according to claim 1 wherein the threaded fastening means comprise cap screws, and wherein the fusible spacers reside between the cap screw heads and the support plate.

* * * * *